Aug. 19, 1952 R. D. OWEN 2,607,880

ELECTROSTATIC HEATING

Filed Sept. 21, 1945

INVENTOR.

BY Ralph D. Owen

Ralph Hamman
attorney

Patented Aug. 19, 1952 2,607,880

UNITED STATES PATENT OFFICE 2,607,880

ELECTROSTATIC HEATING

Ralph D. Owen, Erie, Pa., assignor to Lord Manufacturing Company, Erie, Pa., a corporation of Pennsylvania Application September 21, 1945, Serial No. 617,710

2 Claims. (Cl. 219—47)

In dielectric heating in high frequency electrostatic fields, the efficiency is materially increased by frequencies resonant with harmonics or subharmonics of the dipole natural resonant frequency of the material to be heated. This invention is intended to further increase the efficiency by tuning the output or utilization circuit for resonance throughout the heating cycle. This is desirable because of the change in dielectric constant as the temperature increases cuts down the heating.

Figure 1:
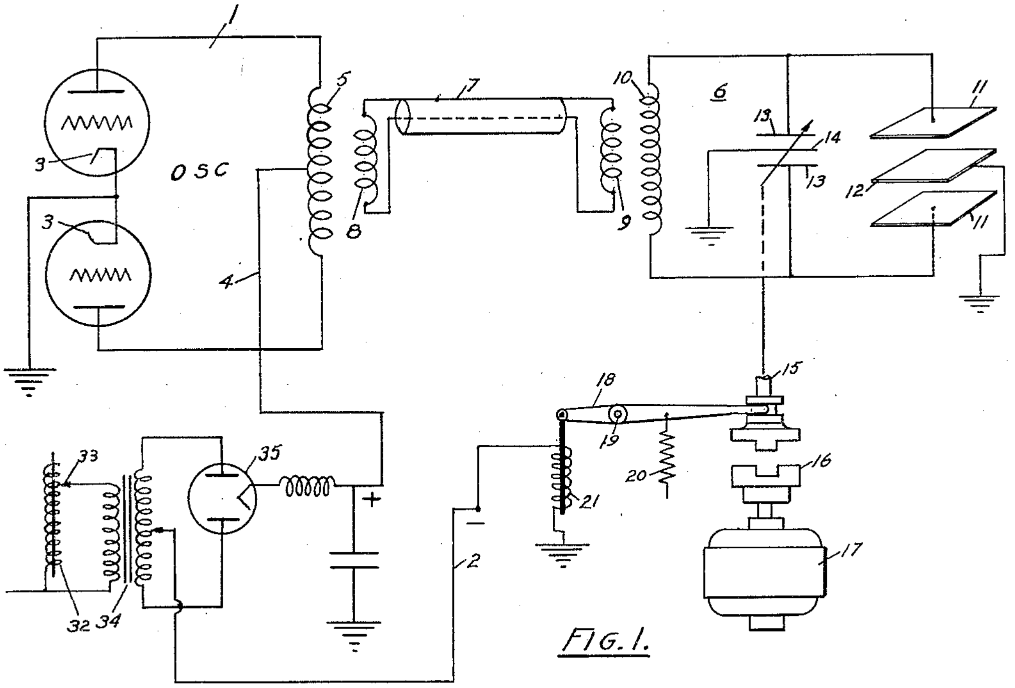
Figure 2:
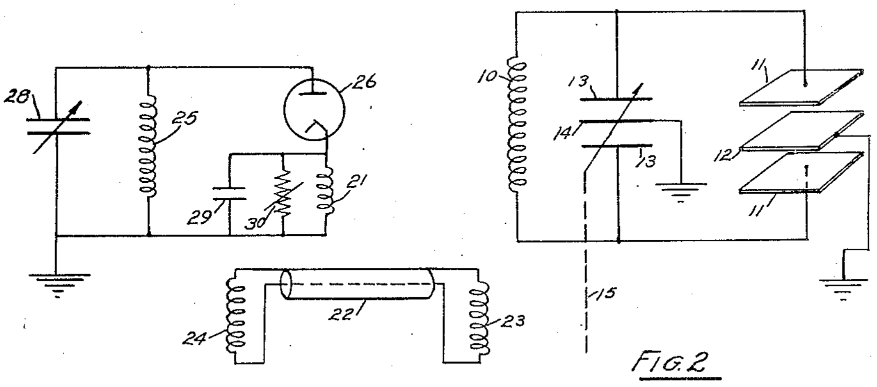

In the drawing, Fig. 1 is a diagram of a dielectric heating circuit, and Fig. 2 is a modification of the control for substitution in Fig. 1.

In the drawing, 1 indicates some of the elements of a push-pull oscillator having the grounded side 2 of the power supply connected to the cathodes 3 and the high side 4 of the power supply, connected to the center of an output inductance 5. The power is fed from the oscillator to a utilization circuit 6 through a coaxial line 7 having an inductance 8 coupled to the inductance 5, and an inductance 9 coupled to an inductance 10 in the utilization circuit. The frequency of the oscillator will vary with the material to be heated. For rubber, an oscillator frequency of 30–35 megacycles has been found satisfactory. The inductance 10 is connected to electrodes 11, associated with a grounded electrode 12. These electrodes are spaced apart to receive the material to be heated between the electrodes 11 and 12, and will vary in shape with the configuration of the material. Across the inductance 10 is connected a tuning condenser having stationary plates 13 and a rotatable plate 14 connected to a shaft 15 through a clutch 16 to an electric motor 17, which runs continuously during the heating cycle. The clutch is controlled by a shift lever 18 pivoted at 19 and urged into the engaged position by a spring 20. The size of the tuning condenser is such that the utilization circuit can be tuned to resonance throughout the heating cycle. At resonance, the current in the utilization circuit is a maximum, and accordingly, the power input to the oscillator is a maximum. In other words, the input (D. C.) current to the oscillator corresponds or is proportional to the output (A. C.) current of the oscillator. At this maximum value a relay 21 in the ground side 2 of the oscillator input overcomes the force of the spring 20 and pulls the shift lever 18 to the clutch release position. When the oscillator input current drops below the maximum value, the spring 20 overcomes the pull of the relay 21 and moves the clutch to the engaged position, causing rotation of the rotatable plate 14 of the condenser until the clutch is disengaged at the resonant position. Due to the mechanical over-run, the relay is adjusted to disengage the clutch when the input current to the oscillator is slightly off exact resonance. The slight additional rotation of the condenser after the clutch is released does not materially interfere with the resonant tuning of the utilization circuit. Since the capacity of the condenser varies from a maximum to a minimum during each half revolution of the rotatable plate 14, the tuning requires less than one revolution of the plate.

In Figure 2 is shown a modification of the tuning control, for substitution in Figure 1, corresponding parts being indicated by the same reference numerals. This circuit is particularly adapted for applications in which an oscillator feeds two or more utilization circuits, each of which may have a separate control for its tuning condenser. The inductance 10 (which may be fed from a high frequency power supply as indicated by the reference numerals 1, 2, 3, 4, 5, 7, 8, 9, 32, 33, 34, 35 in Fig. 1) is coupled through a coaxial line 22 having an inductance 23 coupled to the inductance 10, and an inductance 24 coupled to an inductance 25, connected across a rectifier 26 and the relay 21 controlling the clutch 16. A condenser 28 is connected across the inductance 25 for tuning to the oscillator frequency so voltage in the inductance 25 will correspond or be proportional to the current in the inductance. Across the relay 21 in the cathode circuit of the rectifier 26 is a condenser 29 shunted by a variable resistance 30. During the operating of the heating circuit, a voltage builds up across the relay 21 which is proportional to the current flowing in the utilization circuit. As in the previously described construction the relay is adjusted to disengage the clutch (to exert a pull overcoming the spring 20) at a current corresponding to the resonant tuning of the utilization circuit. At smaller currents, the relay drops out and the clutch engages so as to tune the circuit to resonance.

In both the Fig. 1 and Fig. 2 control, there is a tuning condenser which, during each revolution, goes through a complete cyclic variation in capacity from a minimum to a maximum and back to a minimum. In both controls, the tuning cycle of the condenser is stopped by a relay which disengages or stops the condenser drive. In Fig. 1, the D. C. input to the high frequency power supply is used to actuate the relay, because this current is proportional to the high frequency current output appearing in the utilization circuit. In Fig. 2, a fraction of the high frequency current appearing in the utilization circuit is picked up and rectified thereby producing a direct current for the relay. Both controls use a simple direct current relay and in both, the relay operating current is proportional to the high frequency current. When the utilization circuit is out of resonance, the condenser is started on its tuning cycle. No effort is made to determine whether the capacity of the tuning condenser is too high or too low. The tuning condenser is merely started on its tuning cycle and stopped when the correct value is reached. This may involve only a small fraction of a revolution or nearly a full revolution. The correct value of the tuning condenser is always reached in less than one revolution.

In general there are three conditions under which the automatic tuning of the heating circuit comes into operation. When a new piece of material is placed between the heating electrodes variations in the physical dimensions and dielectric constant invariably set the automatic tuning in operation to change the tuning from that used in a preceding heating cycle. This is true even though there is no change in the material other than that due to variations in manufacture. Another condition under which the tuning operates is when the heating circuit sparks over. The starting of the tuning immediately cuts off the sparking and prevents injury to the material. With proper adjustment the sparking will occur infrequently, although it is substantially never entirely eliminated. The retuning of the circuit at the start of sparking prevents destructive arcing and decreases the scrap loss. The third condition under which the tuning comes into operation is when the dielectric constant of the material changes sufficiently during the heating cycle to upset the resonance. This is most noticeable when the physical dimensions of the material are such that the ratio of inductance to capacitance in the heating circuit has a value making the tuning sensitive to changes in capacity due to the change in dielectric constant.

In order to minimize the sparking, particularly at the start of the heating cycle, it is desirable that the heating cycle be started at a low voltage and brought up to full voltage after the heating circuit has been tuned for resonance. It is not necessary that the low voltage operation continue for more than a few seconds, and in practical operation it has been found that the full voltage can be applied from two to ten seconds after the start of the heating cycle. The voltage is applied to the heating electrodes by the voltage fed to the power supply from an auto transformer 32 having a variable tap 33 connected to a transformer 34 feeding a full wave rectifier 35 connected to the power supply 2, 4. In heating rubber the tap 33 at the start of the heating cycle is adjusted to about fifty percent of the full operating voltage. The tap is held at this point until the tuning circuit has operated to tune the heating circuit to resonance. The tap can then be quickly moved to the full operating voltage. Since the operator can tell by the operation of the relay 21 when the circuit is tuned, it is feasible to have the tap 33 shifted manually. After the relay 21 has operated to break the clutch connection to the rotating plate 14 of the tuning condenser the operator can immediately move the tap 33 to the full voltage position without causing sparking. If the heating cycle is started at the full voltage, sparking will invariably take place. The reason for the sparking is not entirely clear, but it is apparently due to minute particles nonuniformly distributed about the surface of the rubber and to transient voltages which might normally exceed the full operating voltage at the start of the heating cycle.

What I claim as new is:

1. In electrostatic heating, spaced electrodes for association with the material to be heated, a high frequency power circuit including an inductance connected across the electrodes and a tuning condenser for tuning the circuit for resonance, a unidirectional power drive for cycling the condenser through its range including a start-stop control, and a relay responsive to the power output in the utilization circuit for actuating the control to start when the power output drops below the resonance value and for actuating the control to stop when the power output rises to the resonance value.

2. In electrostatic heating, a high frequency power source feeding a utilization circuit including spaced electrodes for association with material to be heated, a tuning condenser in the utilization circuit having a rotating plate, a power drive for the plate including a clutch, and a relay responsive to the power output in the utilization circuit engaging the clutch when the power output drops and disengaging the clutch when the power output reaches a predetermined value.

RALPH D. OWEN.

REFERENCES CITED

The following references are of record in the file of this patent:

UNITED STATES PATENTS

| Number | Name | Date |
|---|---|---|
| 1,945,867 | Rawls | Feb. 6, 1934 |
| 2,112,418 | Hart et al. | Mar. 29, 1938 |
| 2,147,689 | Chaffee | Feb. 21, 1939 |
| 2,179,261 | Keller | Nov. 7, 1939 |
| 2,231,457 | Stephen | Feb. 11, 1941 |
| 2,251,277 | Hart et al. | Aug. 5, 1941 |
| 2,358,454 | Goldstine | Sept. 19, 1944 |
| 2,370,624 | Gillespie | Mar. 6, 1945 |
| 2,396,004 | Gilbert | Mar. 5, 1946 |
| 2,401,991 | Walton et al. | June 11, 1946 |
| 2,415,799 | Reifel et al. | Feb. 11, 1947 |
| 2,416,172 | Gregory et al. | Feb. 18, 1947 |
| 2,433,842 | Griffin | Jan. 6, 1948 |
| 2,467,285 | Young et al. | Apr. 12, 1949 |
| 2,473,188 | Albin | June 14, 1949 |